United States Patent [19]

Abrams et al.

[11] Patent Number: 4,810,549

[45] Date of Patent: Mar. 7, 1989

[54] PLUSH TEXTURED MULTICOLORED FLOCK TRANSFER

[75] Inventors: Louis B. Abrams; Gerhard A. Arzberger, both of St. Louis, Mo.

[73] Assignee: High Voltage Graphics, Inc., Saint Louis, Mo.

[21] Appl. No.: 88,292

[22] Filed: Aug. 24, 1987

[51] Int. Cl.[4] .............................................. B32B 33/00

[52] U.S. Cl. ........................................ 428/88; 156/72; 427/206; 428/90

[58] Field of Search ...................... 428/90, 88; 156/72; 427/206

[56] References Cited

U.S. PATENT DOCUMENTS

| | | | |
|---|---|---|---|
| 2,636,837 | 4/1953 | Summers | 428/90 |
| 3,793,050 | 2/1974 | Mumpower | 427/206 |
| 4,142,929 | 3/1979 | Otomine | 156/72 |
| 4,292,100 | 9/1981 | Higashiguchi | 156/72 |
| 4,396,662 | 8/1983 | Higashiguchi | 428/90 |

FOREIGN PATENT DOCUMENTS

| | | |
|---|---|---|
| 2065031 | 6/1981 | United Kingdom . |
| 2126951 | 9/1982 | United Kingdom . |

*Primary Examiner*—Marion C. McCamish

*Attorney, Agent, or Firm*—Sandler & Greenblum

[57] ABSTRACT

Plush textured multicolored flock transfers are obtained which have the appearance of a direct flocked article and the manufacturing and application advantages of a flock transfer. The method of manufacture includes applying sequentially to an adhesive coated base sheet different colored flocks which can be greater than 0.3 mm long through predetermined areas of masked screens.

18 Claims, 1 Drawing Sheet

PLUSH TEXTURED MULTICOLORED FLOCK TRANSFER

BACKGROUND OF THE INVENTION

I. Field of the Invention

The invention generally relates to a method of manufacturing flock transfers. Specifically, the invention is direct to multicolor flock transfers which exhibit an enhanced texture.

II. Description of the Prior Art

There are two basic method of applying a multi-color flock design to a surface. The first method is referred to as multi-color direct flocking. The flock is applied directly to the surface that forms the finished product. Usually wallpaper, carpets and decorative elements of garments are produced in this manner.

An example of direct flocking is found in U.S. Pat. No. 3,793,050 to Mumpower. This particular direct flocking method is unique in that it allows the use of different color and size of flock in the same design surface to be flocked. The adhesive is rendered tacky and each color of flock is passed through a screen that restricts that color to the desired part of the adhesive layer. A multicolor flock design is thus obtained on the surface.

Multicolor direct flocking suffers a number of disadvantages. It is an exacting procedure with many variables to be controlled requiring specialized flocking equipment and an environment that is controlled for relative humidity. During the startup of such a procedure many reject-quality articles may result as the variables are adjusted by trial and error, and the desired result is found. The procedure is relatively slow since usually only one article at a time may be decorated. Further, if the article to be decorated has an uneven surface like many textiles, then density of the flock, control, speed and the quality of the finished design i.e. sharpness of lines separating colors, vivid images, etc., would be adversely affected. Thus, direct flocking has been limited in use in the United States.

Flock transfers are a second method of employing flock fibers in a decorative manner. Examples of these transfers are illustrated in U.S. Pat. Nos. 4,292,100 and 4,396,662 both to Higashiguchi and UK patent application Nos. 2,065,031 to Maitland and 2,126,951 to Transworth. Transfers are formed by applying flock to a release sheet having a temporary release adhesive coating. The flock is then dyed with different color inks and coated with a binding layer and hot melt adhesive in a desired decorative design. The tranfers are applied to articles with heat and pressure. The release sheet is peeled away leaving a finished decorative design.

Conventional multicolor flock transfers have not achieved significant commercial success in the United States due to a number of inherent limitations. The basic underlying problem is that a richly textured appearance has not been achieved using flock to justify the additional cost over conventional screen printing. The flock transfers are relatively flat and thus a plush textured multicolored look is not achieved.

A fundamental limitation of the flock transfer manufacturing method is the problem of penetrating the flock fiber with printing ink to form the desired design. Typical flocks used in flock transfers are only 0.3 mm long. This is unlike direct flocking which can use colored flocks of approximately 1 mm to 3 mm in length.

An objective of the present invention is to produce a plush textured flock transfer which presents a plush textured three dimensional appearance. A second objective is to provide a means of producing plush-textured multicolored flock transfers which can be manufactured in batches containing more than one transfer per batch. A third objective of the invention is to provide a method of decorating articles with a multi-color plush textured design which overcomes the disadvantages and limitations of direct flocking. Finally, an objective of the invention is to allow manufacturers of products to economically make use of plushly-textured flock designs in place of screen printed designs.

SUMMARY OF THE INVENTION

A method of making a multi-colored flock transfer which comprises the printing of a release adhesive upon a base sheet in a predetermined design. Each different color flock is then sequentially flocked into its designated part of the adhesive design, separated from eath other by screens. The free end of the flock fibers are coated with a binding adhesive upon which a hot melt adhesive is applied.

DESCRIPTION OF THE PREFERRED EMBODIMENTS

Figure 1:
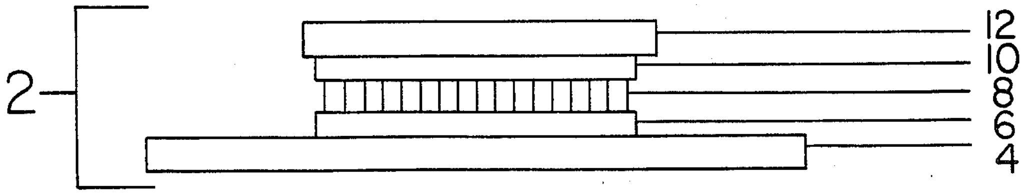
FIG. 1 is a cross-sectional view of the flock transfer of the invention.

As shown in FIG. 1 the transfer 2 of the present invention comprises a dimensionally stable paper sheet 4 to which a conventional flock transfer release adhesive 6, usually silicone wax, is applied in the reverse of a desired pattern. That is a pattern which corresponds to the overall image which is to be flocked. The flock 8 which may be rayon or any other type of conductive material such as nylon, polyester etc. is applied to the activated adhesive 6 by conventional electrostatic means or gravity.

In order to achieve a multicolor effect the flock 8 is applied through a gauze-like mesh screen. The different colors are achieved by using different color flock. As each color is applied a different screen is used which only allows penetration of the particular colored flock onto its section of the release adhesive 6. Since the flock is not printed with ink following flocking as in a conventional multicolor transfer, the length of the flock can be substantially increased to 1 mm as opposed to the conventional 0.3 mm. Thus, the transfer is much more plush, vivid and three dimensional.

The flock 8 is coated with a binder adhesive 10 such as a water based acrylic 1 which binds the flock into a unit. The binder 10 may contain an additional adhesive, a hot melt, for binding the transfer to a substrate. In the alternative the hot melt adhesive 12, usually a granular polyester or nylon, may form a separate layer. The use of separate hot melt layers is preferable.

Figure 2:
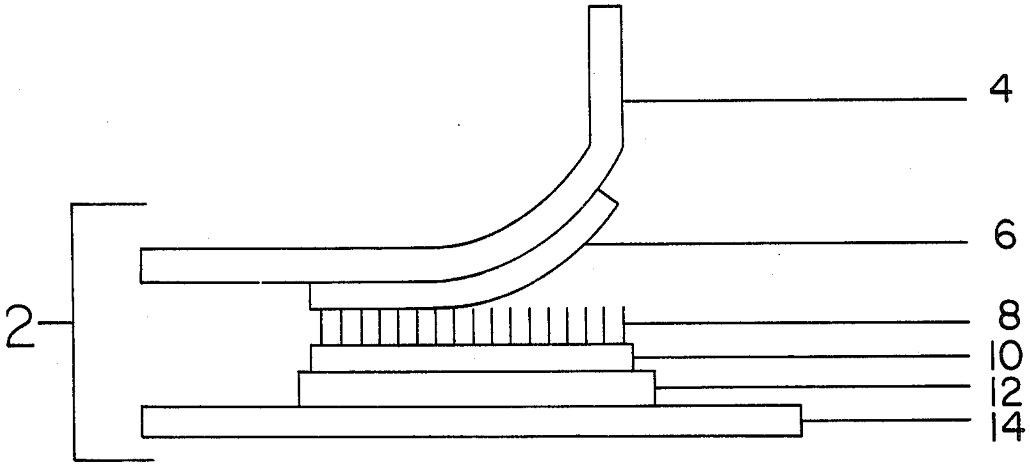
FIG. 2 is a cross-sectional view of the flock transfer of the invention being applied to a surface.

FIG. 2 illustrates the application of the transfer to a textile 14 or other surface. The hot melt surface 12 is placed against the textile 14. Heat and pressure is applied to the release sheet 4 in order to bond the transfer to the garment. The release sheet 4 with the adhesive 6 is then pulled away from the flock 8. This leaves a transfer permanently affixed to the garment.

The present invention utilizes the general materials and flocking techniques found in U.S. Pat. Nos. 3,793,050; 4,292,100; and 4,396,662 and UK patent application Nos. 2,065,031 and 2,126,951 all of which are incorporated by reference herein. Although the invention utilizes conventional materials and techniques which can be generally found in various prior art references, the particular combination of elements of the present invention produces a unique and superior flock transfer.

An example of the method of producing the flock transfers of the invention comprises:

(1) a silicone wax layer 6 in the reverse of a predetermined pattern is applied to a dimensionally stable base sheet 4, such as, a bond paper.

(2) A first color of rayon flock 8 is passed through a monofiliment polyester screen for ten to fifteen seconds through an electrostatic field. The screen has open sections in those areas which correspond to the first colored section of the reversed design. The flock 8 is inbedded in the wax layer 6 since the wax acts as a ground for the charged particles.

(3) This procedure is then followed for each succeeding color of rayon flock 8 that is to be electrostatically flocked in order to form the desired design. The unit is then dried.

(4) The tips of the exposed flock 8 is printed using conventional screen printing equipment with a water based acrylic binder 10 (40%-60% water). The binder 10 binds the flock 8 and further provides opacity and brilliance by reflecting light.

(5) The binder 10 is powdered with a nylon polyester hot melt adhesive 12. The transfer is then dryed overnight.

(6) After brushing and vacuuming excess adhesive 12 the transfer is placed in an infrared dryer to cross link the binder 10 and adhesive 12.

(7) To apply the transfer to a textile 14, the adhesive surface 12 is positioned on the textile 12. Heat and pressure (5-60 seconds at 300-350 degrees F.) is applied to the paper 4. The transfer is allowed to cool and the paper 4 and wax 6 are removed by peeling the paper 4 from the flock 8. The desired flock design is thus permanently affixed to the textile.

We claim:

1. A multicolor flock transfer comprising:

(a) a base sheet having a surface area coated with a release adhesive;

(b) precolored flock of at least two different colors that are longer than 0.3 mm having ends adhering to said surface area in the form of predetermined color patterns of a design; and (c) a binding adhesive applied to other ends of said precolored flock, whereby said predetermined color patterns of said design of said multicolor flock is adapted to be transferred onto a product.

2. The multicolor flock transfer of claim 1, wherein said flock has a length of at least 1 mm.

3. The multicolor flock transfer of claim 1, wherein said mulicolor flock transfer is affixed to a textile.

4. A method of making a multicolored flock design on a product comprising:

(a) printing a release adhesive upon a base sheet;

(b) sequentially flocking different precolored flock through open sections of different barriers into said release adhesive to result in a plurality of single color patterns arranged to form a predetermined flock design;

(c) applying a binding adhesive to free ends of said flock to form a transfer of said flock design; and (d) transferring said flock design from said base sheet to vividly form said flock design on a surface of a product.

5. The method of claim 4 wherein said base sheet is paper.

6. The method of claim 4 wherein said base sheet is transparent.

7. The method of claim 4, wherein said precolored flock has a length greater than 0.3 mm.

8. The method of claim 7, wherein said precolored flock has a length at least 1 mm.

9. The method of claim 4, wherein said barrier is a mesh screen.

10. The method of claim 4 wherein said binding adhesive comprises an adhesive to bind the fibers and a hot melt adhesive.

11. The method of claim 7 wherein said hot melt adhesive is applied as a separate adhesive layer.

12. The method of claim 8 wherein each of said barriers is a mesh screen.

13. The method of claim 12, wherein said product is a textile.

14. The method of claim 12, wherein said flock has a length greater than 0.3 mm.

15. The method of claim 12, wherein said flock has a length of at least 1 mm.

16. The method of claim 15, wherein said transferring comprises subjecting said flock design to heat and pressure and wherein said product is a textile.

17. The method of claim 16 wherein said base sheet is removed following the application to a textile by heat and pressure.

18. The method of claim 4, wherein said product is a textile.

* * * * *